US007278576B2

(12) United States Patent
Endo et al.

(10) Patent No.: US 7,278,576 B2
(45) Date of Patent: Oct. 9, 2007

(54) RECORDING MATERIAL IDENTIFICATION METHOD, TONER SUPPLY METHOD AND IMAGE FORMING APPARATUS

(75) Inventors: Takeshi Endo, Shizuoka-ken (JP); Takahiro Kojima, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 220 days.

(21) Appl. No.: 11/209,688

(22) Filed: Aug. 24, 2005

(65) Prior Publication Data

US 2006/0065710 A1 Mar. 30, 2006

(30) Foreign Application Priority Data

Sep. 30, 2004 (JP) ........................... P2004-287588

(51) Int. Cl.
*G06F 17/00* (2006.01)

(52) U.S. Cl. ............ 235/462.15; 235/376; 235/462.13; 235/487

(58) Field of Classification Search ................ 235/376, 235/462.15
See application file for complete search history.

(56) References Cited

U.S. PATENT DOCUMENTS 6,851,616 B2 * 2/2005 Maruyama ................. 235/492

FOREIGN PATENT DOCUMENTS

| | | | |
|---|---|---|---|
| JP | 05-224479 | A | 9/1993 |
| JP | 11-027452 | A | 1/1999 |
| JP | 2003-058003 | A | 2/2003 |

* cited by examiner

*Primary Examiner*—Seung Ho Lee
(74) *Attorney, Agent, or Firm*—Foley & Lardner LLP

(57) ABSTRACT

An identification method of a recording material container of the present invention sets a recording material container having a first identifying code for storing a recording material in an image forming apparatus, reads the first identifying code in the image forming apparatus, reads an identifying sheet having a recorded second identifying code in the image forming apparatus, and identifies truth or falsehood of the recording material stored in the recording material container on the basis of the relationship between the first identifying code read and the second identifying code.

20 Claims, 6 Drawing Sheets

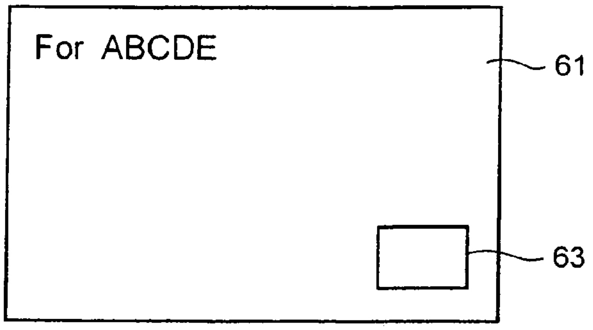
FIG. 5
FIG. 6
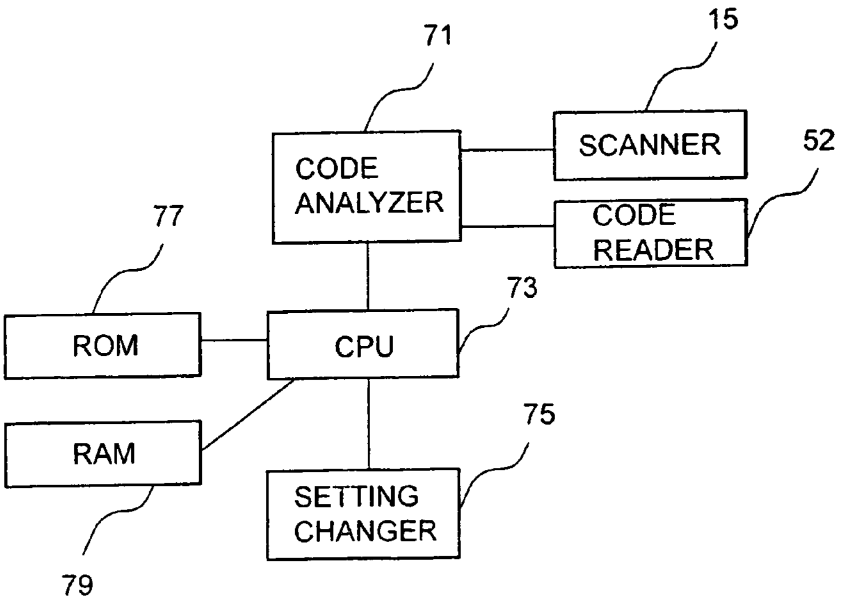
FIG. 7

RECORDING MATERIAL IDENTIFICATION METHOD, TONER SUPPLY METHOD AND IMAGE FORMING APPARATUS

CROSS REFERENCE TO RELATED APPLICATION

This application is based upon and claims the benefit of priority from the prior Japanese Patent Application No. 2004-287588 filed on Sep. 30, 2004, the entire contents of which are incorporated herein by reference.

FIELD OF THE INVENTION

The present invention relates to a recording material identification method, a toner supply method which are used in a recording apparatus, and an image forming apparatus.

DESCRIPTION OF THE BACKGROUND

In an image forming apparatus such as a copier, toner is supplied from a toner container into a developing unit. When the toner stored in the container is exhausted, the container must be discarded and exchanged with another container storing new toner.

With respect to such toner, a toner manufacturer, from a viewpoint of supply of high-quality images to a user, recommends him to use manufacturer-recommended toner including a manufacturer's genuine article. However, an imitation just like the manufacturer's genuine article is manufactured and it may be on the market. When the toner quality of this imitation is low, the quality of images obtained by use of the toner is low and various troubles may be stirred up easily. Furthermore, a user himself may often consider and use such an imitation as a manufacturer's genuine article. In this case, a user makes a complaint about such a trouble against a manufacturer of genuine toner.

To eliminate such a problem, an art for identifying whether toner is a genuine article of a manufacturer or an imitation has been developed. For example, an art for attaching a bar code to a toner container, reading the bar code information, thereby identifying whether it is a genuine article or not is disclosed in Japanese Patent Application Publication No. 5-224479. Further, in Japanese Patent Application Publication No. 2003-58003, an art for attaching an EEPROM to a toner container, recording an identifying code by user in the EEPROM, reading existence of the user identifying code at the time of use of the toner, and identifying it as an imitation or a genuine article is disclosed.

However, decoding such codes by manufacturers of imitations progresses, and the codes are altered, and imitations of toner are not exterminated actually.

Therefore, a toner identification art by which codes can be hardly decoded is desired. By doing this, it is necessary to prevent beforehand false toner from use.

As described above, conventionally, there is an art for identifying whether a recording material such as toner is a genuine article or not by an identifying code. However, decoding and altering of identifying codes are executed easily.

SUMMARY OF THE INVENTION

An object of the present invention is to provide a recording material identification method for identifying whether a recording material is a genuine article or not by which decoding and altering are hardly executed and a false recording material is prevented from use.

Further, an object of the present invention is to provide a toner supply method for preventing false toner from supply.

Further, an object of the present invention is to provide an image forming apparatus for preventing to use false recording material.

According to an embodiment of the present invention, there is provided an identification method of a recording material stored in a recording material container used together with an image forming apparatus, comprising: reading a first identifying code in an image forming apparatus in which a recording material container storing a recording material and having the first identifying code is set; reading an identifying sheet having a recorded second identifying code by a scanner provided in the image forming apparatus; and identifying truth or falsehood of the recording material stored in the recording material container on the basis of a relationship between the first identifying code and the second identifying code.

Further, according to an embodiment of the present invention, there is provided a toner supply method of supplying a recording material from a recording material container to a developing unit of an image forming apparatus, comprising: reading a first identifying code in an image forming apparatus in which a recording material container storing a recording material and having the first identifying code is set; reading an identifying sheet having a recorded second identifying code in the image forming apparatus; discriminating a relationship between the read first identifying code and the second identifying code; and supplying the recording material from the recording material container to the developing unit when it is identified that the read first identifying code and the second identifying code have a predetermined fixed relationship.

Further, according to an embodiment of the present invention, there is provided an image forming apparatus comprising: a recording material container having a first identifying code to store a recording material; a developing device supplied with the recording material from the recording material container; a code reader to read the first identifying code; a scanner to read an identifying sheet on which a second identifying code is recorded; and an identifying unit to identify truth or falsehood of the recording material stored in the recording material container on the basis of a relationship between the first identifying code read by the code reader and the second identifying code read by the scanner.

BRIEF DESCRIPTION OF THE DRAWINGS

FIG. 5 is a schematic view of the identifying sheet relating to the embodiment of the present invention;

FIG. 6 is a plane view indicating the first and/or second identifying code relating to the embodiment of the present invention;

FIG. 7 is a block diagram for identifying the recording material relating to the embodiment of the present invention;

DETAILED DESCRIPTION OF THE EMBODIMENTS

Hereinafter, the embodiment of the present invention will be explained.

Figure 1:
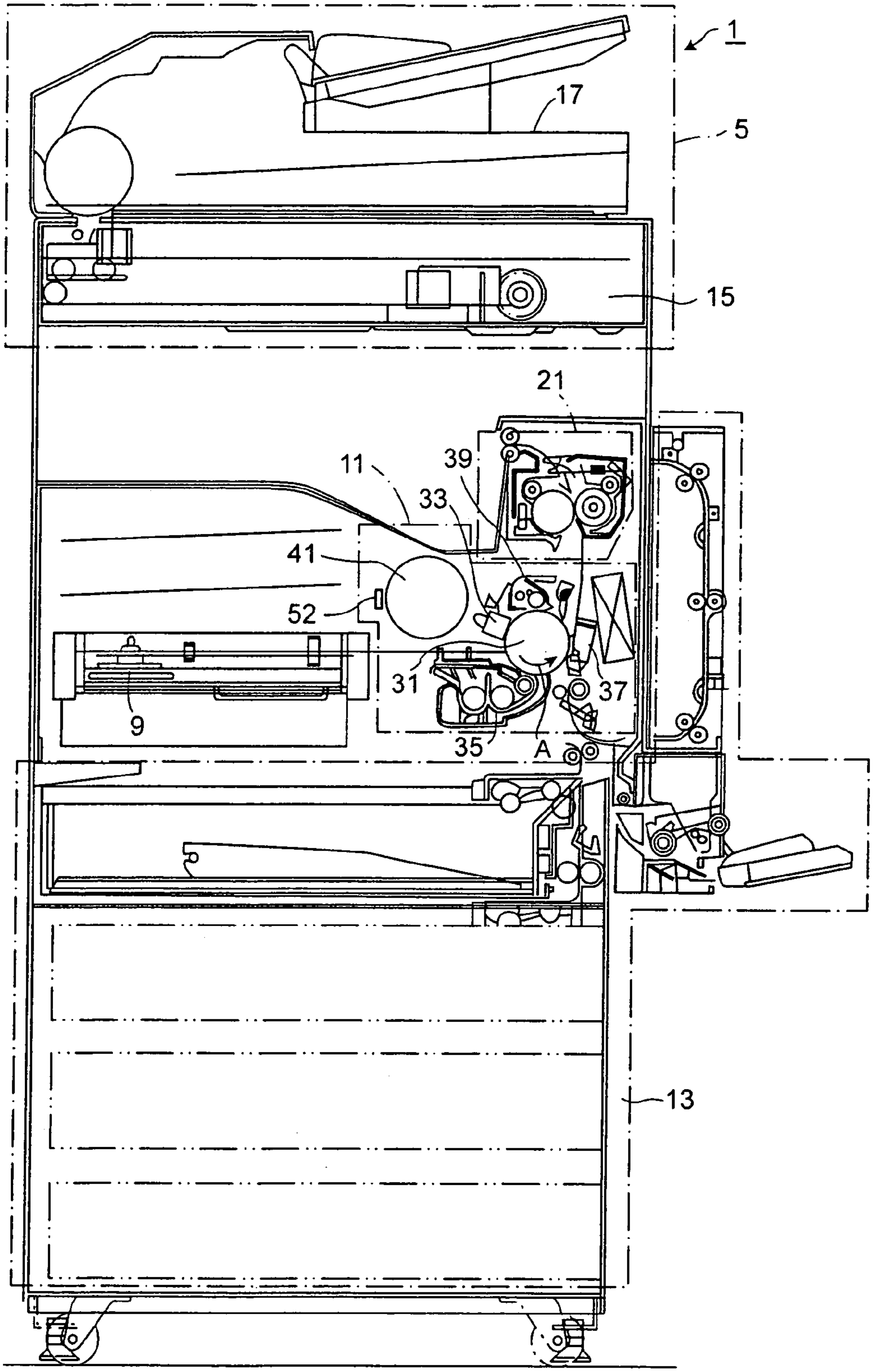
FIG. 1 is a cross sectional view of the copier as an image forming apparatus relating to the embodiment of the present invention.

FIG. 1 is a cross sectional view of copier 1 as a recorder and in copier 1, the identification method of the recording material relating to this embodiment, for example, toner and the toner supply method are executed.

As shown in FIG. 1, copier 1 has image reader 5 installed at the upper part of the apparatus, laser unit 9 positioned under image reader 5, image forming unit 11, and paper supply unit 13.

Image reader 5 includes scanner 15 and document feeder 17. Document feeder 17 conveys a document put on document feeder 17 to scanner 15 and the conveyed document is read by scanner 15.

The image read by scanner 15 is converted to image data and is stored in an image processor not drawn. On the basis of the stored image data, laser unit 9 irradiates a laser beam toward image forming unit 11.

In image forming unit 11, a toner image is formed on photosensitive drum 31 and is transferred onto a sheet of paper supplied from paper supply unit 13. The sheet of paper onto which the toner image is transferred in image forming unit 11 is conveyed to fixing unit 21 and the toner image on the sheet of paper is fixed.

Image forming unit 11 will be explained further. In image forming unit 11, around photosensitive drum 31 rotating, main charger 33, developing unit 35, transfer/separation unit 37, and cleaner 39 are arranged. By a laser beam irradiated to photosensitive drum 31 charged by main charger 33 from laser unit 9 according to the image data, an electrostatic latent image is formed. Developing unit 35 internally stores toner, and the electrostatic latent image is supplied with toner from developing unit 35 and is developed, thus a toner image is formed. The formed toner image is transferred onto a sheet of paper supplied from paper supply unit 13 by the operation of transfer/separation unit 37 and the sheet of paper onto which the toner image is transferred is separated from photosensitive drum 31.

The sheet of paper on which the toner image is formed passes fixing unit 21, thus the toner image is fixed on the sheet of paper and is ejected outside.

In FIG. 1, on developing unit 35, toner bottle 41 as a recording material container is set. For set toner bottle 41, identification of toner which will be described later, that is, identification of toner bottle 41 is executed and toner is supplied to developing unit 35.

Figure 2:
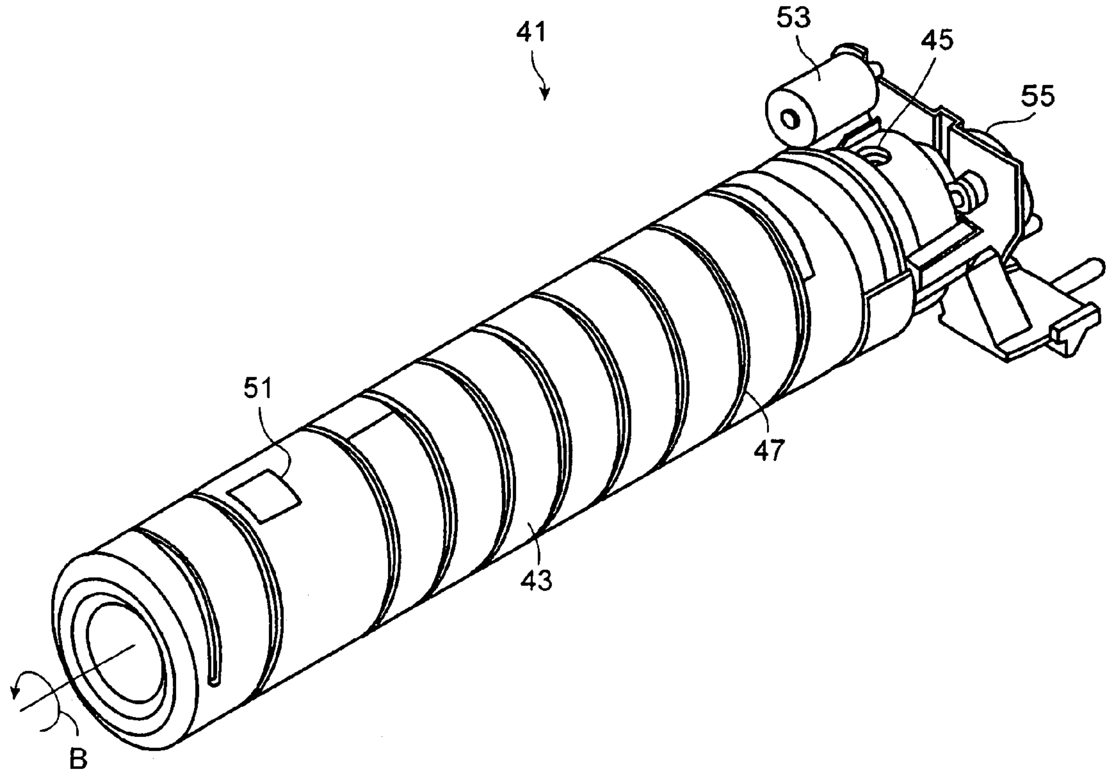
FIG. 2 is a perspective view of the recording material container relating to the embodiment of the present invention.

FIG. 2 is a perspective view of toner bottle 41 and the drive unit of toner bottle 41. Toner bottle 41 stores toner inside bottle main body 43. The front end of bottle main body 43 is connected to tube 46 having supply port 45 for supplying toner. Toner bottle 41 has an almost cylindrical shape. Toner bottle 41 is rotated when toner bottle 41 is set in copier 1. To supply toner from tube 46 having toner supply port by the concerned rotation, spiral 47 is formed on the outer periphery of toner bottle 41. Namely, spiral 47 of a concavity with a depth of 5 mm is continuously formed from the end of bottle main body 43 toward supply port 45.

In the neighborhood of the end of toner bottle main body, first identifying code 51 is formed. To read first identifying code 51, as shown in FIG. 1, code reader 52 is installed on the side of copier 1. The contents of the first identifying code will be described later.

Figure 3:
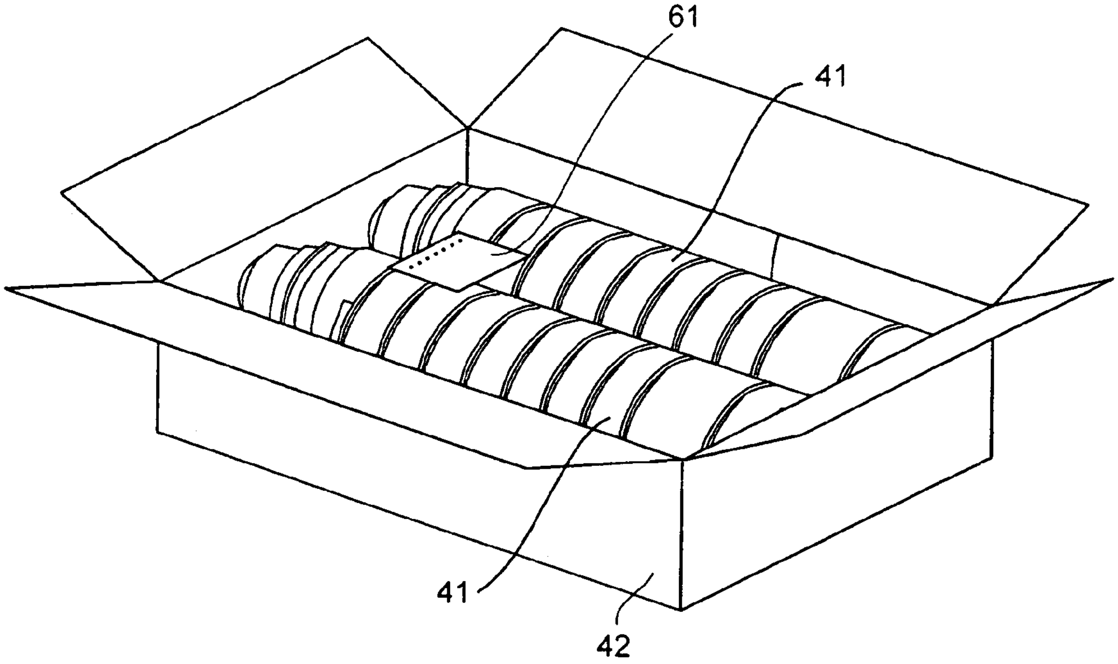
FIG. 3 is a perspective view showing the inside of the box in which the identifying sheet and recording material container relating to the embodiment of the present invention are packed.

Toner bottle 41, as shown in FIG. 3, is stored in package box 42 and identifying sheet 61 is stored in the same box.

Figure 4:
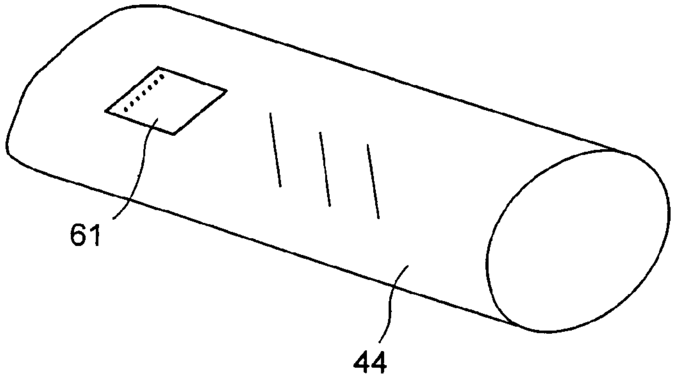
FIG. 4 is a perspective view showing the condition that the recording material container relating to the embodiment of the present invention is packed in a package bag having an attached identifying sheet.

Further, as shown in FIG. 4, when toner bottle 41 is packed in package bag 44, identifying sheet 61 is attached onto the outer surface of package bag 44. Or, second identifying code 63 may be printed on the outer surface of package bag 44.

Toner bottle 41, since gear 55 meshing with toner bottle 41 rotates according to rotation of motor 53 which is a driving source, rotates in the direction of arrow B shown in the drawing. During rotation, first identifying code 51 faces code reader 52 and the contents of first identifying code 51 are read by code reader 52. Further, toner bottle 41 is structured so as to rotate in the opposite direction of the direction of arrow B shown in the drawing. By the rotation in the opposite direction, the stored toner is conveyed toward toner supply port 45 along spiral 47. The toner conveyed up to toner supply port 45 is dropped into developing unit 35 via toner supply port 45. Namely, toner is supplied to developing unit 35 from toner bottle 41.

FIG. 5 shows identifying sheet 61 packed together in package box 42 as shown in FIG. 3 in which toner bottle 41 is packed. On identifying sheet 61, second identifying code 63 is recorded. On identifying sheet 61, the machine kind names to which identifying sheet 61 can be applied are recorded as a form of For ABCDE. The contents recorded on identifying sheet 61 can be read by scanner 15.

Second identifying code 63, for example, as manufacture information of toner bottle 41 packed in a package box or toner, includes the manufacturing date and an intrinsic identifying number such as 123456789. And, first identifying code 51 aforementioned, similarly to second identifying code 63, includes information composed of the manufacturing date and intrinsic identifying number.

In package box 42 of toner bottle 41, two toner bottles 41 are stored and to identify the two toner bottles, first identifying code 51, in addition to the aforementioned contents, has information of 1 or 2 at the end thereof.

And, these information is converted to two-dimensional codes and is recorded on toner bottle 41 or identifying sheet 61. The two-dimensional code, although the bar code has information only in either of the vertical and horizontal directions, has information in both vertical and horizontal directions, and it is coded, and even if the reading area is small, the two-dimensional code can include more information. An example of conversion to a two-dimensional code is shown in FIG. 6. Information finally converted to a two-dimensional code is first identifying code 51 or second identifying code 63. When a two-dimensional code is used, it is more difficult to decode it.

FIG. 7 is a block diagram for processing first identifying code 51 and second identifying code 63. The contents read respectively by scanner 15 and code reader 52 are analyzed by code analyzer 71. Namely, from identifying sheet 61 taken out from package box 42 or identifying sheet 61 separated from package bag 44, second identifying code 63 is read by scanner 15. On the basis of the contents of first identifying code 51 and second identifying code 63 analyzed by code analyzer 71, CPU 73 identifies whether toner bottle 41 is an imitation or not by a method which will be described later. Further, CPU 73, on the basis of the contents of first identifying code 51 and second identifying code 63 analyzed by code analyzer 71, sends a signal to setting changer 75 so as to change the setting of the copier. ROM 77, so as to perform a predetermined operation by CPU 73, stores various programs. RAM 79 stores data according to processing results of CPU 73.

The identification method of toner bottle 41 will be explained by referring to the flow chart shown in FIG. 8.

A case that in copier 1, toner is consumed and toner bottle 41 storing new toner is exchanged with a new one will be explained by referring to an example.

Firstly, empty toner bottle 41 is pulled out from copier 1. And, new toner bottle 41 is set in copier 1. The copier side detects setting of toner bottle 41. To detect the kind of toner bottle 41, toner bottle 41 is rotated in the direction of the arrow B shown in FIG. 2. When toner bottle 41 rotates in the opposite direction of the direction of arrow B drawn, toner is conveyed to toner supply port 45 formed on tube 46 from the end of bottle main body 43 by spiral 47. On the other hand, for execution of identification, toner bottle 41 is rotated in the direction of arrow B drawn, thus toner is not conveyed to supply port 45.

When toner bottle 41 rotates in the direction of arrow B drawn, first identifying code 51 faces code reader 52 and the contents of first identifying code 51 are read. At Step 1 shown in FIG. 8, whether first identifying code 51 is read or not is identified, and when it is not read, it is identified as an error, and a predetermined error process is executed. As an error process, for example, a process of notifying a user of the purport that set toner bottle 41 is not a genuine article on a display unit of copier 1 not drawn may be considered.

On the other hand, identifying sheet 61 put in package box 42 of toner bottle 41 is used for exchange of toner bottle 41. Identifying sheet 61 is put on document feeder 17 of copier 1 and second identifying code 63 recorded on identifying sheet 61 is read by scanner 15. At Step 2 shown in FIG. 8, whether second identifying code 63 is read or not is identified, and when it is not read, it is identified as an error, and similarly to Step 1, the predetermined error process is executed.

For first identifying code 51 and second identifying code 63 which are read, the contents of the codes are analyzed by code analyzer 71. For the contents of the codes, at Step 3 shown in FIG. 8, firstly, whether the end information of first identifying code 51 is 1 or 2 is identified. When it is not 1 or 2, assuming that there are possibilities that the toner stored in toner bottle 41 may not be a genuine article but an imitation, it is decided as an error. Next, at Step 4, CPU 73 decides whether first identifying code 51 and second identifying code 63 have a predetermined relationship of a pair or not. The decision of whether there is a relationship of a pair or not is a decision of whether the information of first identifying code 51 except the end information thereof and second identifying code 63 record the same manufacturing date and identifying code or not. When the two do not coincide with each other, it is judged that there is no relationship of a pair, and assuming that the toner stored in toner bottle 41 may not be a genuine article but an imitation, the error process is executed.

Figure 8:
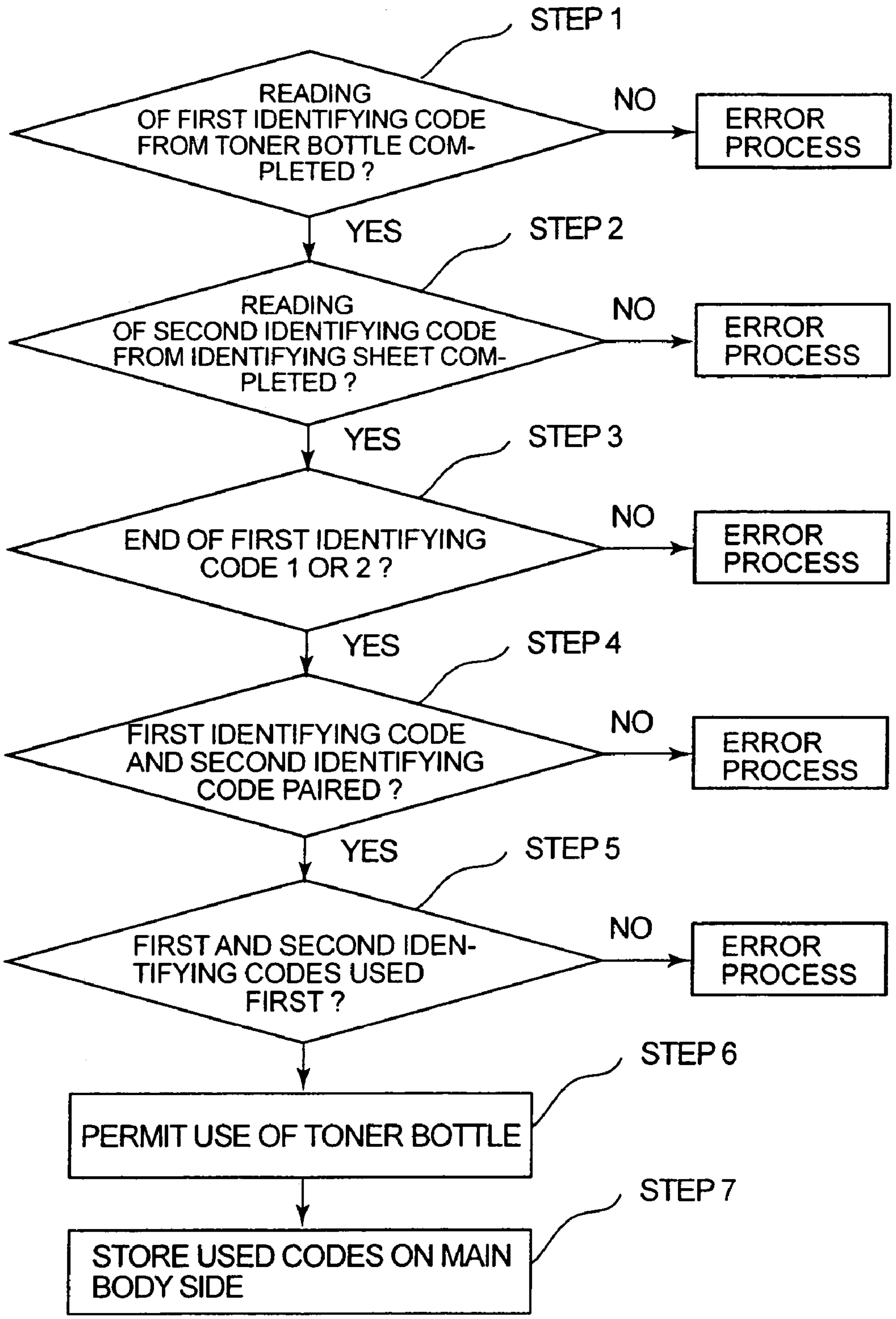
FIG. 8 is a flow chart indicating the identifying procedure of the recording material relating to the embodiment of the present invention.

Furthermore, first identifying code 51 and second identifying code 63 judged as that there is a relationship of a pair have only one common code and at Step 5 shown in FIG. 8, whether the common code is read first by copier 1 or not is decided. On the side of copier 1, at Step 4, when the relationship of a pair is judged, the common code of first identifying code 51 and second identifying code 63 is stored in RAM 79. And, toner bottle 41 is exchanged and whenever the common code of first identifying code 51 and second identifying code 63 is recognized, the contents of RAM 79 such as whether the recognized common code was used in the past or not are checked and decided. When it is decided as a code already stored in RAM 79, that is, as a code already used, assuming that there are possibilities that the toner stored in toner bottle 41 is not a genuine article but an imitation, it is decided as an error.

And, only toner which is not subject to the error process as a result of the decision at Steps 1 to 5 can be used by copier 1 at Step 6. At Step 7, as described above, the common code of first identifying code 51 and second identifying code 63 of toner bottle 41 which is permitted to use is stored in RAM 79.

In this embodiment, the two-dimensional code is used, so that decoding of the code is difficult. Furthermore, it is necessary to read the information of not only toner bottle 41 but also identifying sheet 61, even if false toner bottle 41 is manufactured, when there is not identifying sheet 61 having a predetermined relationship with toner bottle 41, it is ascertained as a false article. Identifying sheet 61 is of a sheet type which can be discarded easily, so that when the sheet is discarded, identifying sheet 61 does not exist. Therefore, even if used toner bottle 41 is filled again with toner and is reused, when there is not identifying card 61 corresponding to toner bottle 41, it is difficult to use toner bottle 41 just as if a genuine article.

Furthermore, in this embodiment, first identifying code 51 and second identifying code 63 have common code information and the common code is stored in copier 1. And, whether the common code is a code used already or not is discriminated and a code already used is judged as a non-genuine article. Such a processing step is added, thus identification of an imitation can be executed easily.

The two-dimensional code has information in the vertical and horizontal directions, so that it does not require a larger area than conventional bar codes and can include much information. Therefore, in first identifying code 51 or second identifying code 63, a characteristic appearing finely dissimilarly for each manufacturing lot of toner, for example, information on the toner powder amount is recorded, for example, in second identifying code, and it is read by copier 1, and the developing conditions of copier 1 are controlled according to the read information, thus fine image quality adjustment can be executed according to the toner quality.

Figure 9:
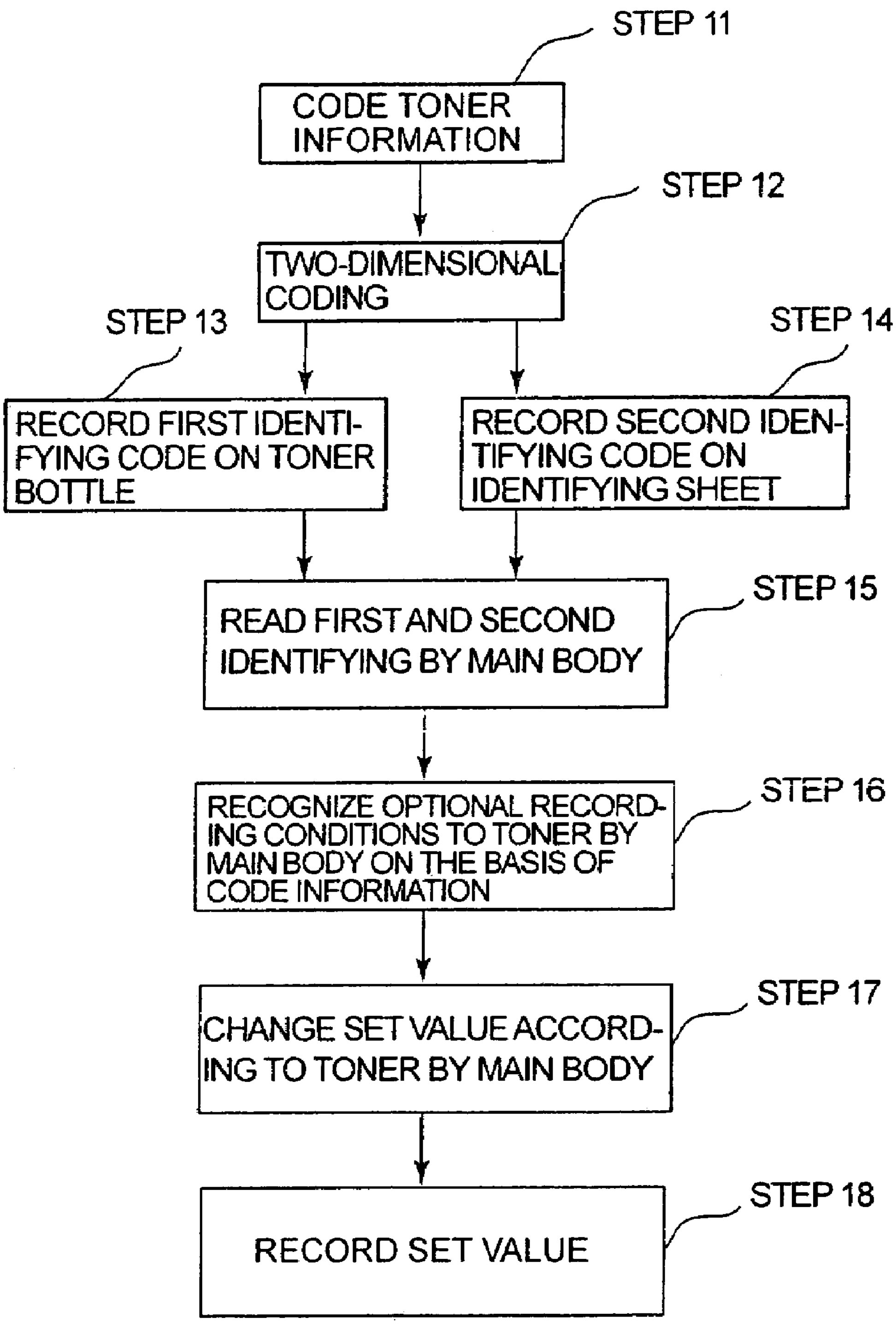
FIG. 9 is a flow chart indicating the processing contents on the basis of the first and second identifying codes relating to the embodiment of the present invention.

FIG. 9 shows an example of changing of the setting of copier 1 on the basis of toner information recorded in first identifying code 51 and second identifying code 63.

At Step 11, the toner information at each lot, here, as an example, the toner powder containing information is coded together with the manufacturing date and identifying number by an appropriate method. At Step 12, the coded contents are converted to a two-dimensional code. The information converted to a two-dimensional code is recorded on a label (not drawn) attached to toner bottle 41 as first identifying code 51. Simultaneously, as second identifying code 63, the two-dimensional code is recorded on identifying sheet 61. Identifying sheet 61 having the common code information and toner bottle 41 must be put into same package box 42, so that care should be taken in manufacture. For example, an advice must be made that identifying sheet 61 and the label are controlled as one set, and immediately after the label is attached to toner bottle 41, toner bottle 41 is packed in the package box together with identifying sheet 61.

At Step 15, when exchanging toner bottle 41, first identifying code 51 and second identifying code 63 recorded on toner bottle 41 and identifying sheet 61 are respectively read by copier 1. At Step 16, the read code information is read by the same method as that shown in FIG. 8. However, in this case, it is known beforehand that toner information is included in the read information, so that the toner information is read at Step 15 and then at Step 16, CPU 73 recognizes an optimal copy condition to toner on the basis of the toner information. On the basis of the recognition result of CPU 73, the setting of the copier is changed via setting changer 75 at Step 17 and the set value is recorded at Step 18.

The toner information and other various information are given to the two-dimensional code like this, thus finer image quality adjustment and adjustment according to user needs can be made.

The embodiment of the present invention is explained above. However, the present invention is not limited to the embodiment aforementioned and within a range which is not deviated from the object of the present invention, needless to say, the present invention can be modified variously.

Further, whether it is a genuine article or not can be identified on the basis of first identifying code 51 and second identifying code 63. However, when a user desires to use toner bottle 41 though it is not a genuine article, the present invention may be structured so as to make a decision first and then permit use of toner bottle 41. Namely, by adding such a decision step, the user can know whether it is a genuine article or not, so that he is notified of it and then may select use of it. By use of such a constitution, it can be prevented that the user uses toner bottle 41 thinking it as a genuine article and a trouble is caused against user's intent.

Further, the present invention identifies the toner container such as a toner bottle by a plurality of codes, though the codes may be various codes other than two-dimensional codes. At least on one code, information is recorded using a two-dimensional code, thus there is an advantage that information hardly decoded can be recorded at a small outlay.

Further, identifying sheet 61 is packed together in package box 42 of toner bottle 41, though the information may be directly recorded on package box 42. In this case, identifying sheet 61 is cut off and second identifying code may be read by scanner 15 from identifying sheet 61.

Furthermore, as a recording material, not only to toner but also, for example, to even ink used in an ink jet printer, the identification method and toner supply method of the present invention can be applied.

By the present invention, a container storing toner or ink can be prevented from use of an imitation.

What is claimed is:

1. An identification method of a recording material stored in a recording material container used together with an image forming apparatus, comprising:

reading a first identifying code in an image forming apparatus in which a recording material container storing a recording material and having the first identifying code is set;

reading an identifying sheet having a recorded second identifying code by a scanner provided in the image forming apparatus; and identifying truth or falsehood of the recording material stored in the recording material container on the basis of a relationship between the first identifying code and the second identifying code.

2. The method according to claim 1, wherein the first identifying code is formed on an outer surface of the recording material container.

3. The method according to claim 1, wherein the second identifying code is recorded on an identifying sheet stored in a package box in which the recording material container is packed.

4. The method according to claim 1, wherein the second identifying code is printed on a bag in which the recording material container is packed.

5. The method according to claim 1, wherein the second identifying code is recorded on a sheet attached to a bag in which the recording material container is packed.

6. The method according to claim 1, wherein a plurality of the recording material containers are packed in a package box and consecutive numbers are respectively attached at an end of the first identifying code in correspondence with the number of the recording material containers.

7. The method according to claim 1, wherein at least one of the first and second identifying codes is recorded as a two-dimensional code.

8. The method according to claim 1, wherein the recording material stored in the recording material container is toner.

9. The method according to claim 1, wherein the recording material stored in the recording material container is ink.

10. A toner supply method of supplying a recording material from a recording material container to a developing unit of an image forming apparatus, comprising:

reading a first identifying code in an image forming apparatus in which a recording material container storing a recording material and having the first identifying code is set;

reading an identifying sheet having a recorded second identifying code in the image forming apparatus;

discriminating a relationship between the read first identifying code and the second identifying code; and supplying the recording material from the recording material container to the developing unit when it is identified that the read first identifying code and the second identifying code have a predetermined fixed relationship.

11. The method according to claim 10, wherein at least one of the first and second identifying codes is recorded as a two-dimensional code.

12. The method according to claim 10, wherein when it is judged that the first identifying code and the second identifying code have a predetermined relationship, furthermore whether the codes are identifying codes read first or not is discriminated.

13. The method according to claim 12, wherein the recording material is supplied to the developing unit of the image forming apparatus when it is judged that the read codes are first codes.

14. The method according to claim 10, wherein the first identifying code is formed on an outer surface of the recording material container.

15. The method according to claim 10, wherein the second identifying code is recorded on an identifying sheet stored in a package box in which the recording material container is packed.

16. The method according to claim 10, wherein the second identifying code is printed on a bag in which the recording material container is packed.

17. The method according to claim 10, wherein the second identifying code is recorded on a sheet attached to a bag in which the recording material container is packed.

18. The method according to claim 10, wherein a plurality of the recording material containers are packed in a package box and consecutive numbers are respectively attached at an end of the first identifying code in correspondence with the number of the recording material containers.

19. An image forming apparatus comprising:

a recording material container having a first identifying code to store a recording material;

a developing device supplied with the recording material from the recording material container;

a code reader to read the first identifying code;

a scanner to read an identifying sheet on which a second identifying code is recorded; and an identifying unit to identify truth or falsehood of the recording material stored in the recording material container on the basis of a relationship between the first identifying code read by the code reader and the second identifying code read by the scanner.

20. An image forming apparatus comprising:

a recording material container having a first identifying code to store a recording material;

a developing device supplied with the recording material from the recording material container;

a code reader to read the first identifying code;

a scanner to read an identifying sheet on which a second identifying code is recorded;

a discriminating unit to discriminate a relationship between the first identifying code read by the code reader and the second identifying code read by the scanner; and a supply unit to supply the recording material from the recording material container to the developing apparatus when it is identified that the read first identifying code and the second identifying code have a predetermined fixed relationship.

* * * * *